G. SPARMO.
FENDER FOR SELF PROPELLED VEHICLES.
APPLICATION FILED MAY 29, 1911.
1,011,873.
Patented Dec. 12, 1911.
3 SHEETS—SHEET 1.
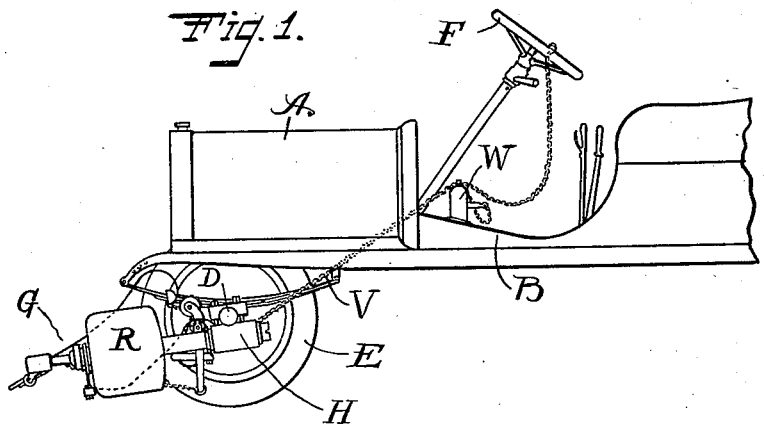
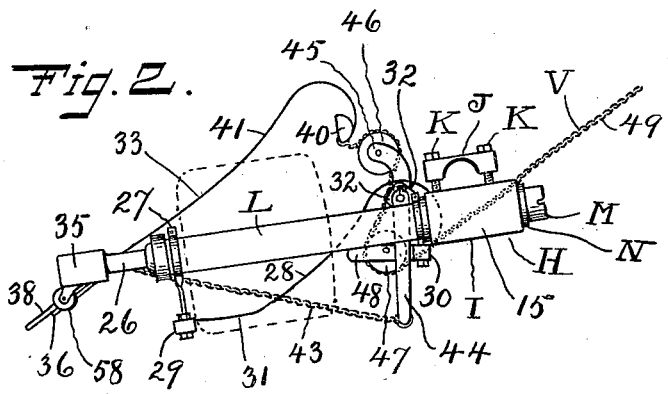
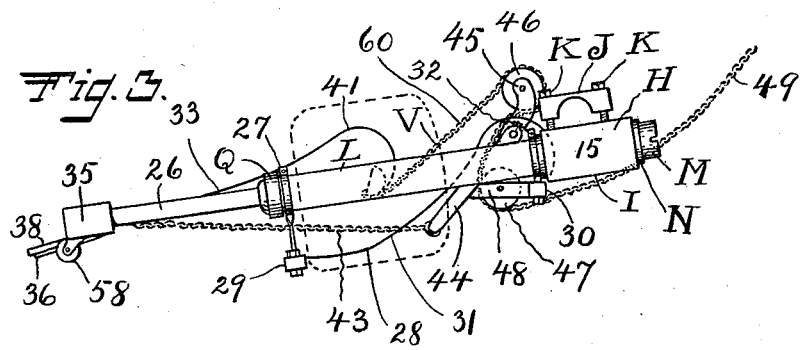

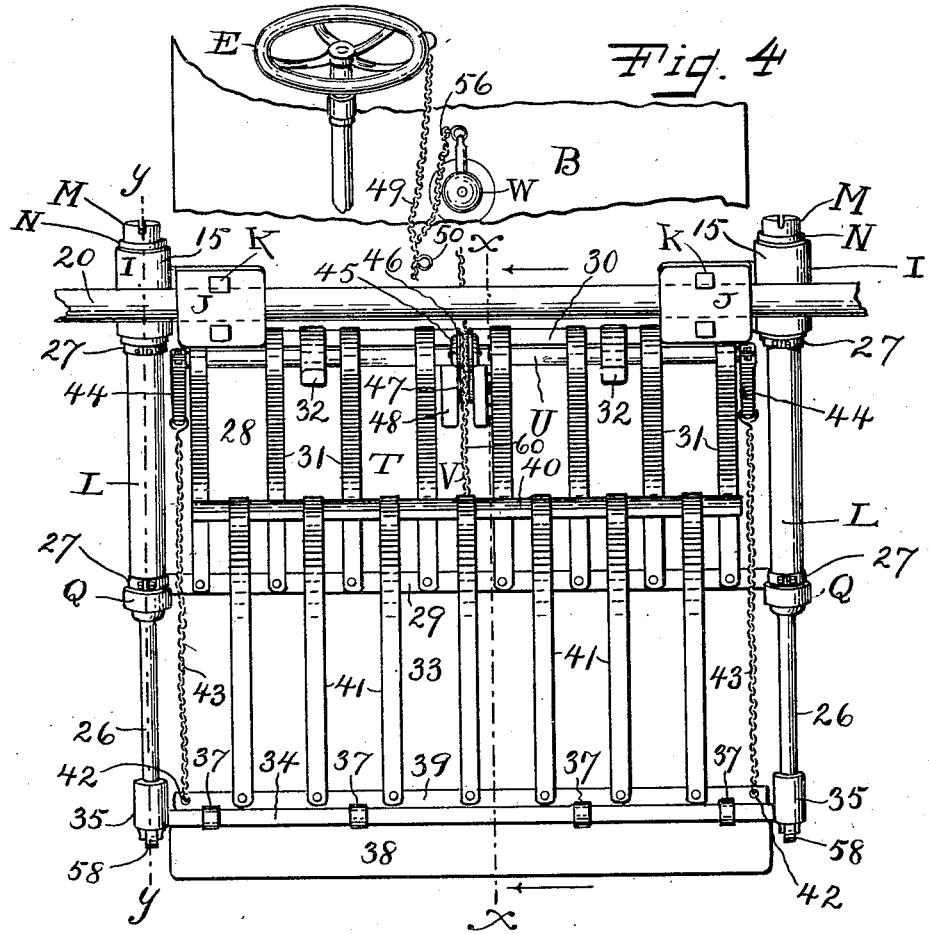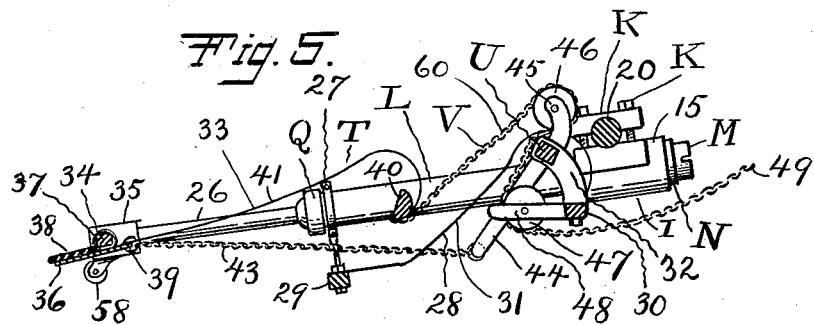

G. SPARMO.
FENDER FOR SELF PROPELLED VEHICLES.
APPLICATION FILED MAY 29, 1911.

1,011,873.

Patented Dec. 12, 1911.

3 SHEETS—SHEET 3.

Witnesses
S. H. Clarke
N. L. Lockwood

Inventor
Giovanni Sparmo
By Louis N. Schmidt
Atty.

UNITED STATES PATENT OFFICE.

GIOVANNI SPARMO, OF NEW BRITAIN, CONNECTICUT.

FENDER FOR SELF-PROPELLED VEHICLES.

1,011,873. Specification of Letters Patent. Patented Dec. 12, 1911.

Application filed May 29, 1911. Serial No. 630,131.

*To all whom it may concern:*

Be it known that I, GIOVANNI SPARMO, a citizen of the United States, residing at New Britain, in the county of Hartford and State of Connecticut, have invented certain new and useful Improvements in Fenders for Self-Propelled Vehicles, of which the following is a specification.

My invention relates to improvements in fenders for self-propelled vehicles, and the objects of my improvements are to produce a fender that is automatic in operation and efficient and reliable in use.

Figure 6:
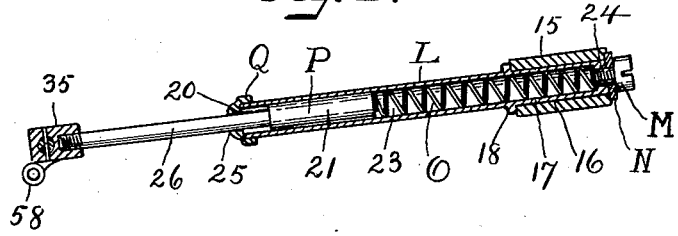
Figure 7:
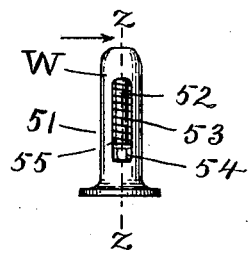
Figure 8:
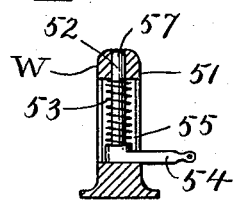
Figure 9:
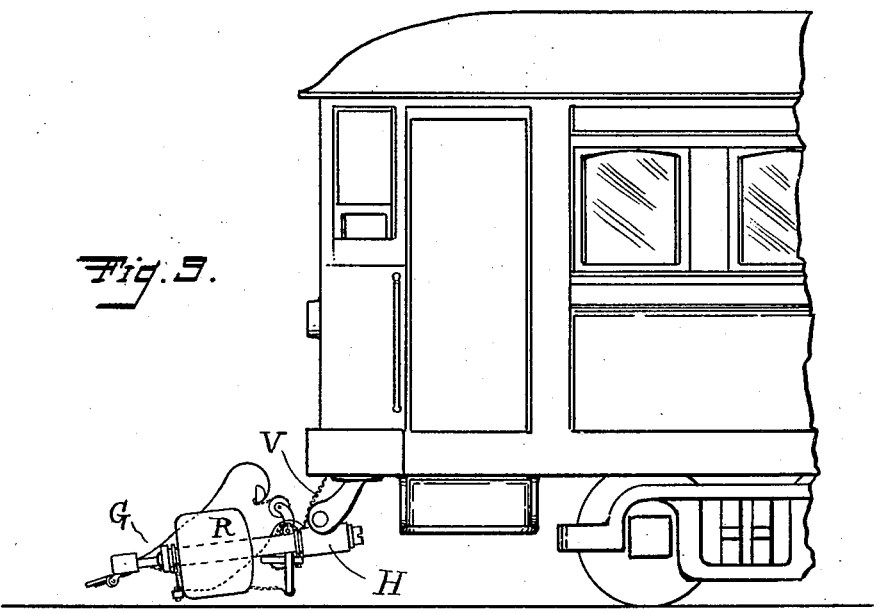

In the accompanying drawings:—Figure 1 is a side elevation of my improved fender and part of an automobile. Fig. 2 is a similar view of the fender on an enlarged scale, the wheel guards or shields being shown in broken lines. Fig. 3 is a similar view of the same, showing the moving element projected forward relatively to the fixed cradle. Fig. 4 is a plan view of the same and part of the automobile. Fig. 5 is a sectional view on the line $x\ x$ of Fig. 4. Fig. 6 is a sectional view on the line $y\ y$ of Fig. 4. Fig. 7 is a side elevation of the latch. Fig. 8 is a sectional view on the line $z\ z$ of Fig. 7. Fig. 9 shows the front end of an electric car equipped with my fender on the same scale as Fig. 1.

A is an automobile in skeleton form having the platform or floor B, front axle D and which is stationary and fixed to the floor B, front wheels E which are pivotally mounted on the said front axle D, and steering wheel F.

G is my fender and the same is supported from the front axle D by means of a pair of clamps H that permit of adjustment thereof in a radial plane. The said clamps H are located adjacent the front wheels E and comprise each a lower body member I suitable for being suspended below the shaft or axle D, suitable on the upper side to coöperate with a strap J, and clamping bolts K for gripping the said axle D, and on the lower side has a sleeve 15 extending generally at right angles to the axle D. The said sleeve 15 has a cylindrical bore 16 that is a fit for and suitable to receive the cylindrical end 17 of the cylinder or spring chamber member L. The said cylindrical end 17 is slipped into the bore 16 from the front end and is limited by a shoulder 18 which abuts against the said sleeve 15 on the forward end thereof. A clamping screw M is screwed axially in the rear end of the said cylindrical end 17. The head of the said screw M bears against a washer N interposed between the same and the rear end of the said sleeve 15 and serves to secure the said cylinder or spring chamber member L rigidly in the said clamp H. As described, the two clamps H serve to support the two chambers L and through them to support the said fender G, and the angular relation of the same relatively to the said shaft or axle D may be changed by operating the screws J and moving the fender to the position desired. The said cylinder or spring chamber L serves as a housing for a spring O, and piston 21 of a piston member P and comprises an elongated cylindrical body, having a cylindrical bore 23 extending from the forward end 20 for nearly the total length, the rear wall being closed except for the axially threaded portion 24 which receives the said clamping screw M and serves as a back bearing for the said spring O. The said forward end 20 is closed by the screw cap Q, having the axial bore 25 that is a fit for the piston rod 26 secured to the piston 21. Wheel guards R are clamped to the exterior of the said spring chamber L, one to each, and they extend laterally therefrom in the form of a shield and in front of the front wheels E and operate to push a person coming in contact with one of them to one side and away from the line of travel of the said front wheel E. The said spring chambers L serve furthermore as a means of support for clamp supports 27, shown as two on each side, which serve as means of support for the rear fixed section or cradle 28 of the fender proper T. The said clamp supports 27 are clamped by their upper ends to the spring chambers L and are connected by their lower ends to the ends of a pair of cross bars, respectively a front bar 29 and a rear bar 30, and support the same. The said bars 29 and 30 are cross-connected by a net work which combines therewith to form the said cradle 28. As shown, the said net work comprises a plurality of resilient members 31, of flat spring steel, which extend in longitudinal planes and are made somewhat S shaped, suitable for receiving a living body with a minimum of injury. The said front bar 29 is preferably located close to the surface of the roadway and the rear bar 30 is in a relatively elevated position, as shown. A pair of arms 32 are rigidly connected by one end to the said rear bar 30 and serve by their forward ends as bearing supports for a guide bar U, which is part of the operating mechanism for the moving section or cradle 33 of the said fender proper T. The said moving cradle 33 comprises a front shaft 34 which cross-connects the outer ends 35 of the piston rods 26, which shaft serves as a pivotal support for the front end thereof. A front plate 36 extends laterally the length of the said shaft 34 between the said ends 35 and is pivotally mounted so as to rock thereon, by means of ears 37, and may be provided on the exposed front face with a rubber facing or cushion 38. As shown, the said front plate 36 extends across and underneath the said shaft 34, the cushion 38 being at the front end. The rear end 39 constitutes essentially a rearwardly extending flange which serves as a front cross-bar for the said moving cradle 33. A rear cross-bar 40 is connected to the said front cross-bar 39 by a net-work generally after the manner of the net-work described as a part of the said fixed cradle 28, and as shown is made up of a plurality of resilient members 41 of flat steel strip, and of curvilinear formation. The said rear cross-bar 40 serves as a rear support and operating handle for tilting or rocking the said moving cradle 33 on the shaft 34, and for setting the same, either directly or by means of the operating chain V. Near the outer ends the said front cross-bar 39 has holes 42, one at each end, for being secured to the forward ends of a pair of guide chains 43. Rollers or wheels 58 may be provided on the lower side of the said piston rod ends 35. The said guide bar U comprises a bar extending parallel with the said rear bar 30, and is pivotally supported as described on the said arms 32, so as to rock on its axis. Side arms or cranks 44 extend radially from the ends of the said guide bar U and are connected by their outer ends to the rear ends of the said guide chains 43. Adjacent the middle of the said guide bar U there extends therefrom radially an arm 45, the direction of which is generally diametrically opposite to that of the said cranks 44, and the said arm 45 is provided at the outer end with a guide wheel 46. A second guide wheel 47 is supported on a fixed axis on an arm 48 extending from the said rear bar 30 and relatively in front of the first guide wheel 46.

An operating chain V extends from the rear cross-bar 40 over the top of the first guide pulley 46, then underneath the second guide pulley 47 and then rearward and generally upward, through the car bottom B to adjacent the steering wheel F, where operating and holding mechanism are provided therefor. The arm 45 is generally upwardly directed and rocks between a position generally vertical and forwardly inclined. The guide pulley 47 is located slightly in front of the said guide pulley 46, whereby a pull on the operating end 49 of the chain V tends to pull the guide pulley 46 forward and through the arm 45 to tilt the guide bar 40, whereby the cranks 44 will be moved backward in unison. By having the two guide chains 43 of uniform length and the cranks 44 properly positioned on the guide bar 40, the said cranks and guide chains serve to guide the outer end of the said moving cradle 33 in parallelism. On account of the elevated position of the guide pulley 46, a pull on the chain V tends first to lift the rear end 40 of the moving cradle 33 and then to pull the same rearward, in opposition to the said springs O, the guide arms or cranks 44 coöperating in effecting the compression thereof. When the operating chain V is released, the said springs O operate to project the forward and moving cradle forwardly, the rear end 40 thereof dropping on the fixed cradle 28.

As a means of automatic operation of my fender I provide a spring catch W on the said car floor B and a ring 50 on the operating chain V suitable for engaging therewith. The said spring catch W comprises a standard 51, which houses a vertically operating rod 52 and spring 53, and which rod 52 has a lateral branch or extension 54, passing through a slot 55 in the said standard 51 and extending outside thereof suitably for being operated by the foot, or by a chain 56 connected thereto, and which for convenience, may be a branch of the main operating chain V. Another branch chain may extend from adjacent the said ring 50 to the steering wheel F and may be convenient in manipulating the operating mechanism. The catch rod 52 is suitable for reciprocating vertically; in the uppermost position having its end 57 suitably exposed to receive and engage the said ring 50 and to be held in such position by the friction due to the main springs O. When released from such frictional engagement, the latch spring 53 tends to force the said rod 52 downward and within the body of the standard 51. A slight contact with the front end of the moving cradle will operate to relieve the frictional engagement of the ring and rod described and will permit the projection of the moving cradle forward by the springs O. As described, in order to set the fender, the moving cradle is withdrawn by a pull on the operating end of the operating chain, and when fully withdrawn, to the normal position, the ring on the chain is engaged with the catch rod of the latch, and these operations may be effected by an operator at the steering wheel. The catch-rod may be elevated to the position for engaging with the ring on the operating chain by either a pull on the end of the branch chain connected to the lateral branch on the rod or by raising the same with the foot. In withdrawing the cradle as described, the pistons operate to compress the main springs O and the operating pressure that is applied to the ends of the piston rods comprises the pressure or pull of the guide chains on the lower side of the piston rod and the pull of the section 60 of the operating chain that extends from the guide pulley 46 to the rear end of the moving cradle and which lies on the upper side of the said piston rod. Accordingly, the resultant pull due to the combined action of the said section 60 and the guide chains will be essentially in line with the piston rod. The precise relation of the two operating forces mentioned involves the length and position of the arm 45 carrying the guide wheel 46, and of the guide cranks 44. I find that good results can be obtained by making the arm 45 a little shorter than the cranks 44, and arranging them generally in opposite directions, radially, and having them almost vertical when in normal position. When the cradle mechanism is set as described, a disturbance of the front bar or plate, as by a collision, will operate to immediately release the engagement of the operating chain and the latch and permit projecting the moving cradle forward with a movement dependent upon the strength of the main operating springs O. Assuming the collision to be due to an individual in the way, the result will be to trip the individual, and throw his body over into the moving cradle, and with a cushioning of the effect of the impact due to the resilient elements of the same, and avoiding collision that would be likely to be serious, with the rigid front parts of the car.

I claim as my invention:—

1. In combination with a fender having a fixed cradle secured to one end of the vehicle and a moving cradle supported adjacent thereto, resilient means tending to project the said moving cradle, setting means operative to set the said moving cradle comprising means for withdrawing the same in opposition to the said first means, and means for holding the said moving cradle when so withdrawn under normal conditions, automatic means operative by a collision to release the said holding means, other means under the control of the operator at the steering wheel that are operative to release the said holding means, and the said setting means also under control of the operator at the steering wheel.

2. A fender comprising a moving cradle, a pair of piston rods attached to the corners and supporting the outer end thereof, pistons on the said piston rods and cylinders therefor, springs housed in said cylinders and tending to project the said pistons, an operating chain connected to the inner end of the said cradle, separate means coöperative with the said pistons and cylinders and attached to the said corners tending to maintain parallelism of movement of the said corners and moving cradle in response to a pull on the said chain.

3. A fender comprising a moving cradle, a spring operated piston connected to the outer end thereof, a rocking guide bar, guide cranks extending radially from one side thereof, a guide pulley arm extending from the opposite side thereof, and provided with a guide pulley, guide chains connecting the said cranks and the said outer end of the cradle, an operating chain passing over the said guide pulley and connected to the inner end of the cradle.

4. A fender comprising a moving cradle, a piston connected to the outer end thereof and having means for projecting the same, a rocking guide bar having guide cranks on one side and a guide pulley arm provided with a pulley on the other side, guide chains connecting the said cranks and the said outer end, a fixed guide pulley arm having a pulley located forward of and below the said first guide pulley, an operating chain extending from the inner end of the said cradle over the said first guide pulley and thence over the said second guide pulley on the fixed arm, and having means on its inner end for being connected to a latch, the said latch operative to be held in frictional engagement with the said chain connecting means by the said piston projecting means and to release said chain by means operative to check the said projecting means.

5. A fender comprising a moving cradle, means for supporting the same generally and tending normally to project the same outwardly, means for withdrawing the said cradle in opposition to said first means, means for holding the said cradle in such withdrawn position comprising a ring on said withdrawing means and a latch, and the said latch operative to disengage itself from the said ring when the said cradle meets an obstruction that operates to check the said cradle projecting means.

6. In an automobile fender having a moving cradle, a piston rod connected to the said cradle and having a rectilinear motion, an operating chain connected to the said cradle and suitable for pulling the same and thereby move the said piston rod, and operative at an angle relatively thereto, means for providing a coöperative pull on the said rod and angularly directed on the other side of the line of movement of the said rod relatively to the said operating chain, and comprising a guide bar provided with a rocking guide crank connected by means having a fixed length to the said rod and with a guide pulley arm having a guide pulley, and the said operating chain passing over the said guide pulley and having the operating end directed forwardly therefrom, whereby an operating pull operates to rock the said guide bar and the connected crank and arm.

7. In a fender having a moving cradle, a piston rod supporting one end thereof and having a rectilinear motion, an operating chain connected to the said cradle and rod, operative to move the same, and the line of movement of the said chain inclined relatively to the line of movement of the said rod, means for providing a longitudinal pull responsive to the movement of the said chain, on the said cradle and rod, also at an angle to the line of movement of the piston rod, but at the other side of said line of movement relating to the line of movement of the said chain, and comprising a rocking guide bar, provided with a crank connected to the said cradle and piston-rod, and located on said other side, and on said first side having a guide pulley arm, and a suitable arrangement of guide pulleys over which the said operating chain passes, whereby the said guide bar will be rocked when an operating pull is applied to the free end of the said chain.

GIOVANNI SPARMO.

Witnesses:
 FRANK B. ARENA,
 SHEFFIELD H. CLARKE.

Copies of this patent may be obtained for five cents each, by addressing the "Commissioner of Patents, Washington, D. C."